(12) United States Patent
Finnigan et al.

(10) Patent No.: US 7,490,034 B2
(45) Date of Patent: Feb. 10, 2009

(54) LEXICON WITH SECTIONALIZED DATA AND METHOD OF USING THE SAME

(75) Inventors: James P. Finnigan, Bellevue, WA (US); Curtis E. Huttenhower, Bellevue, WA (US); Douglas W. Potter, Seattle, WA (US); Kevin R. Powell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 10/137,456

(22) Filed: Apr. 30, 2002

(65) Prior Publication Data

US 2003/0204392 A1 Oct. 30, 2003

(51) Int. Cl.
*G06F 17/21* (2006.01)
*G06F 17/27* (2006.01)

(52) U.S. Cl. .................... 704/10; 704/1; 704/9

(58) Field of Classification Search ............... 382/186, 382/305; 434/169; 364/419.11, 900; 395/613; 704/7, 101, 1, 9, 10; 707/3, 532
See application file for complete search history.

(56) References Cited

U.S. PATENT DOCUMENTS

| | | | | |
|---|---|---|---|---|
| 4,384,329 A | * | 5/1983 | Rosenbaum et al. | 704/10 |
| 4,688,192 A | * | 8/1987 | Yoshimura et al. | 704/10 |
| 4,703,425 A | * | 10/1987 | Muraki | 704/7 |
| 4,724,523 A | * | 2/1988 | Kucera | 715/532 |
| 4,736,296 A | * | 4/1988 | Katayama et al. | 704/8 |
| 4,771,385 A | * | 9/1988 | Egami et al. | 715/532 |
| 4,868,750 A | * | 9/1989 | Kucera et al. | 704/8 |
| 4,991,135 A | * | 2/1991 | Yoshimura et al. | 707/3 |
| 5,056,021 A | * | 10/1991 | Ausborn | 704/9 |
| 5,289,376 A | * | 2/1994 | Yokogawa | 704/10 |
| 5,611,076 A | * | 3/1997 | Durflinger et al. | 707/102 |
| 5,642,522 A | * | 6/1997 | Zaenen et al. | 715/532 |
| 5,708,829 A | * | 1/1998 | Kadashevich et al. | 715/531 |
| 5,715,468 A | * | 2/1998 | Budzinski | 704/9 |
| 5,761,688 A | * | 6/1998 | Morishita | 715/532 |
| 5,789,057 A | * | 8/1998 | Naitou et al. | 428/73 |
| 5,867,812 A | * | 2/1999 | Sassano | 704/10 |
| 5,995,992 A | * | 11/1999 | Eckard | 708/497 |
| 6,021,409 A | * | 2/2000 | Burrows | 707/102 |
| 6,081,774 A | * | 6/2000 | de Hita et al. | 704/9 |
| 6,138,087 A | | 10/2000 | Budzinski | 704/9 |

(Continued)

FOREIGN PATENT DOCUMENTS

EP 0539965 A2 5/1993

OTHER PUBLICATIONS

Houghton Mifflin Company, American Heritage Dictionary, Copyright 2002 2004, Fourth Edition, p. 213.*

(Continued)

*Primary Examiner*—Patrick N Edouard
*Assistant Examiner*—Eric Yen
(74) *Attorney, Agent, or Firm*—Steven M. Koehler; Westman, Champlin & Kelly, P.A.

(57) ABSTRACT

A data structure for a word lexicon includes a plurality of separate data sections for storing information related to word entries. An indices section includes pointers indicating the location of the information. The location of the associated pointers for each word entry is obtained as a function of a list of the word entries.

44 Claims, 4 Drawing Sheets

U.S. PATENT DOCUMENTS

| | | | |
|---|---|---|---|
| 6,278,967 B1* | 8/2001 | Akers et al. | 704/2 |
| 6,298,321 B1* | 10/2001 | Karlov et al. | 704/10 |
| 6,675,169 B1* | 1/2004 | Bennett et al. | 707/101 |
| 6,735,559 B1* | 5/2004 | Takazawa | 704/7 |
| 6,760,695 B1* | 7/2004 | Kuno et al. | 704/9 |
| 6,792,418 B1* | 9/2004 | Binnig et al. | 707/3 |

OTHER PUBLICATIONS

Branimir Boguraev, David Carter, Ted Briscoe, "A Multi-Purpose Interface to an On-line Dictionary", ACM 1987.*

M. Nagao, J. Tsujii, Y. Ueda, M. Takiyama, "An Attempt to Computerized Dictionary Data Bases", ACL, 1980.*

Bozsahin et al., H., "A Categorial Framework for Composition in Multiple Linguistic Domains", In Proceedings of the 4th International Conference on Cognitive Science of NLP, Dublin, CSNLP'95, Jul. 1995.

Chang, Echa; Huang, Chu-Ren; et al. "Induction of Classification from Lexicon Expansion". *Proceedings of the First International WordNet Conference* Jan. 21-25, 2002. Central Institute of Indian Languages, 2002. pp. 155-164.

Gõni et al., J., "A framework for lexical representation", AI95: Fifteenth International Conference. Language Engineering, Montpellier, Francia, pp. 243-252, Jun. 1995.

C.J. Wells, L.J. Evett, P.E. Whitby and R.J. Whitrow: "Fast Dictionary Look-up for Contextual Word Recognition" Pattern Recognition, [Online] vol. 23, No. 5, 1990, pp. 501-508, XP002407899.

A. Ntoulas et al.: "Use of a Morphosyntactic Lexicon as the Basis for the Implementation of the Greek Wordnet" Lecture Notes in Computer Science, 2000, XP002407900.

Fredkin E.: "Trie Memory" Communcations of the Assocation for Computing Machinery, ACM, New York, NY, US, vol. 3, No. 9, Aug. 1960 (1960-68), pp. 490-499, XP002271883.

Official Search Report of the European Patent Office in counterpart foreign application No. 03008804.1-1527 filed May 12, 2006.

* cited by examiner

LEXICON WITH SECTIONALIZED DATA AND METHOD OF USING THE SAME

BACKGROUND OF THE INVENTION

The present invention relates to language or text processing. More particularly, the present invention relates to an improved data structure for storing a lexicon and an improved method of using the same.

Language or text processing encompasses many types of systems. For instance, parsers, spell checkers, grammar checkers, word breakers, natural language processors or understanding systems and machine translation systems are just a few of the types of systems that fall within this broad category.

A common and important component of many language or text processing systems is the lexicon. Generally, the lexicon is a data structure containing information about words. For instance, the lexicon can store indications of syntactic and semantic information. Examples include whether the word is a noun, verb, adjective, etc. In addition, different types of linguistic information can also be stored in the lexicon. Often it is also helpful to store other information useful for the particular type of language processing such as storing information about the word that aids in parsing. In yet other lexicons, indications as to whether the word is a proper name, geographical location, etc. can be useful.

In operation, after receiving an input string of words, the language or text processing system accesses the lexicon to obtain the stored information with respect to each of the words. Having gathered the information about each of the words in the input string, the language or text processing system processes the input string, which can include resolving any ambiguities that may exist based on the word information. For instance, in a natural language processing system, the lexicon assigns parts of speech to each of the words in the input string. A syntactic parser then decides which of the parts of speech assignments are appropriate and builds a structure from the input string, which can then be passed along to a semantic component for interpretation.

Commonly, each entry in the lexicon comprises a single binary large object. Although the information is accessible, this format does not readily allow localized access to commonly used lexical information without having to read in the complete entry. If all of the information pertaining to a word entry must be read in from the lexicon, more memory and processing time is required, particularly if only a small part of the information for the word entry is needed.

Modifying or adding to the lexical information is also difficult. Specifically, in order to modify or add further information to the lexicon, the lexicon author must replicate all of the bits, attributes or other information within each entry, then modify the desired information or add to it, while maintaining the integrity and organization of a very complex data structure.

There thus is a need for an improved lexicon data structure that addresses one, some or all of the disadvantages discussed above.

SUMMARY OF THE INVENTION

One aspect of the present invention is a word lexicon stored on a computer readable medium that has word information adapted for use in a language processing system. The lexicon includes a word list section for storing a plurality of words and a plurality of data sections for storing word information of the plurality of words. The plurality of data sections are separate from each other and the word list section. To access the word information, an indices section is provided and stores pointers pointing to data in the plurality of data sections. An identification of which pointer to use is a function of the corresponding word in the word list section.

The improved lexicon structure provides flexibility and efficiencies not previously available. The indices section and the plurality of data sections allow the lexicon to be adapted to fit the needs of a language processing system such as the computer resources available. In a further embodiment, the lexicon structure allows the word information to be classified or grouped based on a classification. For instance, the classification can be based on the part of speech of the word entry such as whether the word entry can be a noun, verb, adjective, etc. The word information can then be selectively accessed as a function of the classification. In the exemplary embodiment, indicators are provided in pointers to indicate the classification of the corresponding word information.

Other aspects of the present invention include a computer-implemented method for storing word information in a plurality of data sections, storing pointer information in the indices section, and storing the word list in the word list section, the word list having information for identifying the corresponding pointers related to the selected word. Likewise, another aspect is accessing the word information using the data structure for the lexicon provided above.

The structure of the lexicon described above is particularly useful when it is desirable to obtain information from a number of lexicons, which is yet another aspect of the present invention. In general, the data for multiple lexicons for a particular word entry can be combined, ignored or selected as desired by selectively accessing data sections of each of the lexicons.

DETAILED DESCRIPTION OF THE ILLUSTRATIVE EMBODIMENT

Figure 1:
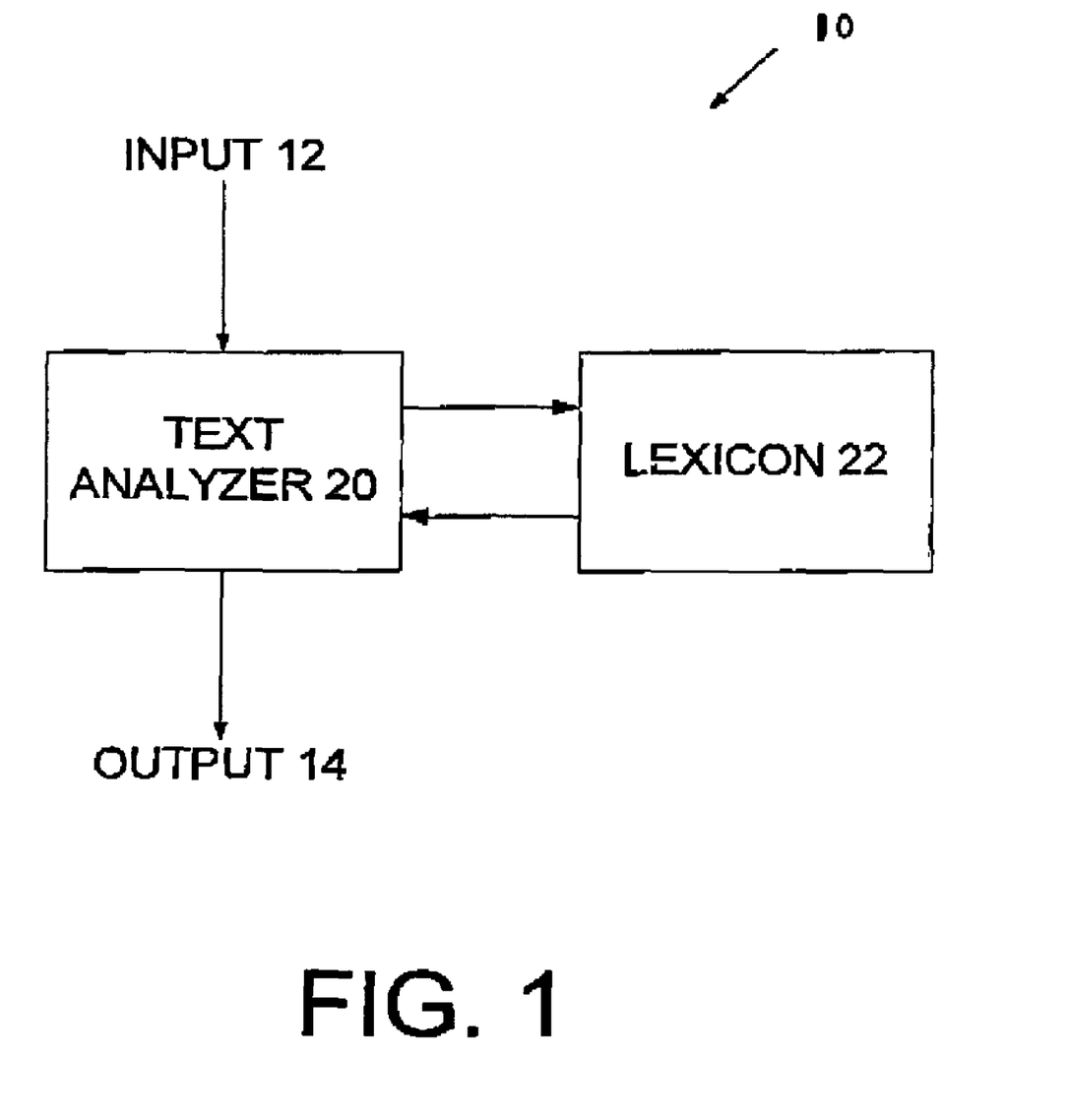
FIG. 1 is a block diagram of a language or text processing system.

FIG. 1 generally illustrates a language or text processing system 10 that receives a language input 12, commonly in the form of a text string, and processes the language input 12 to provide a language output 14, also commonly in the form of a text string. For example, the language processing system 10 can be embodied as a spell checker, grammar checker or natural language processor to name just a few. As appreciated by those skilled in the art, the language processing system 10 can be a stand-alone application, or a module or component accessible by or included in another system.

Generally, the language processing system includes a text analyzer 20 and a lexicon 22. The text analyzer 20 schematically represents components or modules that receive the input 12, access and obtain information from the lexicon 22 and process the word information to provide the output 14. One aspect of the present invention is an improved data structure for lexicon 22 so as to efficiently provide the necessary information to the text analyzer 20 as may be required by its application. For example, word information stored in lexicon 22 can be selectively accessed so that an entire word entry need not be read. In view that the lexicon 22 is a separate component that can be used in many language processing systems and with many forms of text analyzers, general interaction of the text analyzer 20 with the lexicon 22 will be described, but specific details regarding the various forms of text analyzers will not be described, because such a description is not needed for an understanding of the present invention.

Figure 2:
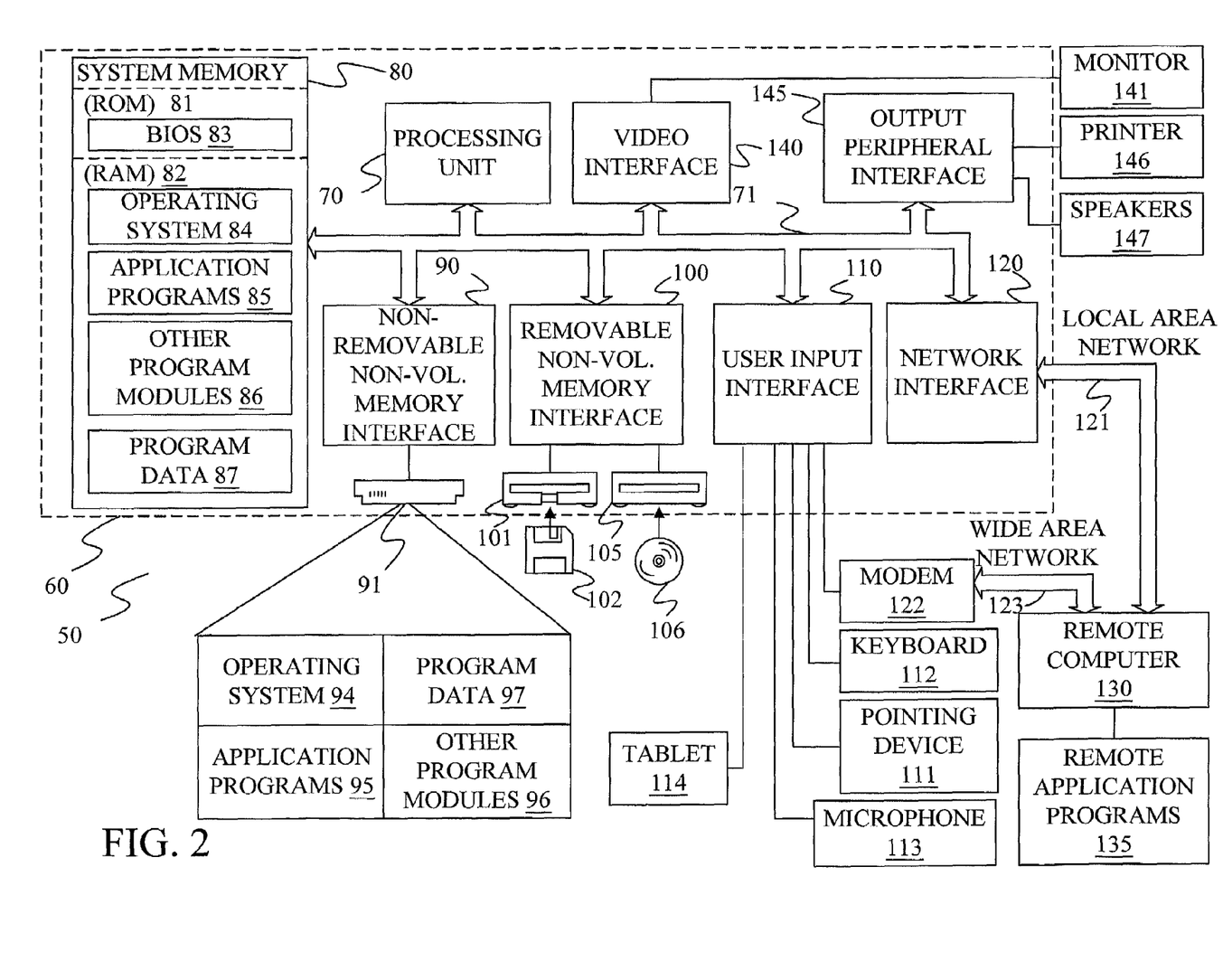
FIG. 2 is a block diagram of an exemplary environment for implementing the present invention.

Prior to a further detailed discussion of the present invention, an overview of an operating environment may be helpful. FIG. 2 illustrates an example of a suitable computing system environment 50 on which the invention may be implemented. The computing system environment 50 is only one example of a suitable computing environment and is not intended to suggest any limitation as to the scope of use or functionality of the invention. Neither should the computing environment 50 be interpreted as having any dependency or requirement relating to any one or combination of components illustrated in the exemplary operating environment 50.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 2, an exemplary system for implementing the invention includes a general-purpose computing device in the form of a computer 60. Components of computer 60 may include, but are not limited to, a processing unit 70, a system memory 80, and a system bus 71 that couples various system components including the system memory to the processing unit 70. The system bus 71 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 60 typically includes a variety of computer readable media. Computer readable media can be any available media that can be accessed by computer 60 and includes both volatile and nonvolatile media removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 50.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

Figure 3:
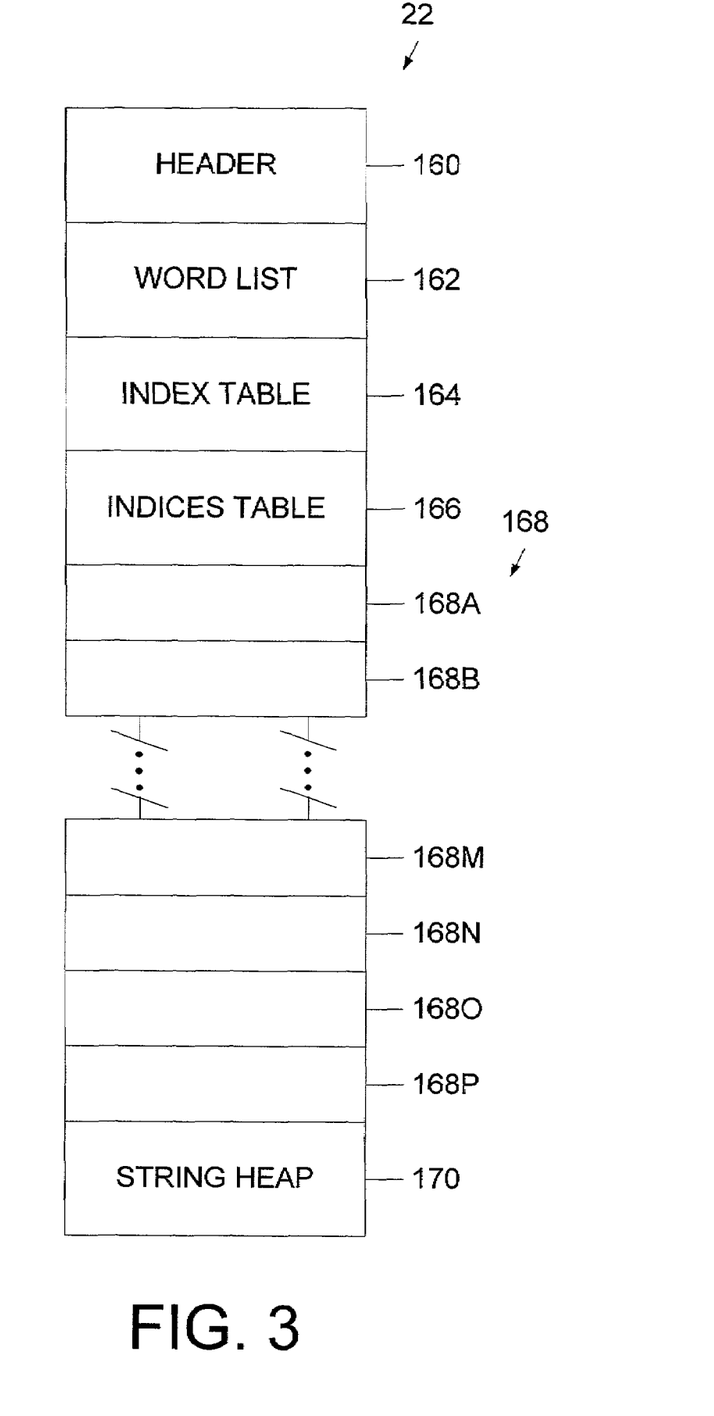
FIG. 3 is a pictorial representation of a lexicon.

The system memory 80 includes computer storage media in the form of volatile and/or nonvolatile memory such as read only memory (ROM) 81 and random access memory (RAM) 82. A basic input/output system 83 (BIOS), containing the basic routines that help to transfer information between elements within computer 60, such as during start-up, is typically stored in ROM 81. RAM 82 typically contains data and/or program modules that are immediately accessible to and/or presently being operated on by processing unit 70. By way of example, and not limitation, FIG. 3 illustrates operating system 84, application programs 85, other program modules 86, and program data 87.

The computer 60 may also include other removable/non-removable volatile/nonvolatile computer storage media. By way of example only, FIG. 2 illustrates a hard disk drive 91 that reads from or writes to non-removable, nonvolatile magnetic media, a magnetic disk drive 101 that reads from or writes to a removable, nonvolatile magnetic disk 102, and an optical disk drive 105 that reads from or writes to a removable, nonvolatile optical disk 106 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 91 is typically connected to the system bus 71 through a non-removable memory interface such as interface 90, and magnetic disk drive 101 and optical disk drive 105 are typically connected to the system bus 71 by a removable memory interface, such as interface 100.

The drives and their associated computer storage media discussed above and illustrated in FIG. 2, provide storage of computer readable instructions, data structures, program modules and other data for the computer 60. In FIG. 2, for example, hard disk drive 91 is illustrated as storing operating system 94, application programs 95, other program modules 96, and program data 97. Note that these components can either be the same as or different from operating system 84, application programs 85, other program modules 86, and program data 87. Operating system 84, application programs 85, other program modules 86, and program data 87 are given different numbers here to illustrate that, at a minimum, they are different copies.

A user may enter commands and information into the computer 60 through input devices such as a keyboard 112, a microphone 113, a handwriting tablet 114, and a pointing device 111, such as a mouse, trackball or touch pad. Other input devices (not shown) may include a joystick, game pad, satellite dish, scanner, or the like. These and other input devices are often connected to the processing unit 70 through a user input interface 110 that is coupled to the system bus, but may be connected by other interface and bus structures, such as a parallel port, game port or a universal serial bus (USB). A monitor 141 or other type of display device is also connected to the system bus 71 via an interface, such as a video interface 140. In addition to the monitor, computers may also include other peripheral output devices such as speakers 147 and printer 146, which may be connected through an output peripheral interface 145.

The computer 60 may operate in a networked environment using logical connections to one or more remote computers, such as a remote computer 130. The remote computer 130 may be a personal computer, a hand-held device, a server, a router, a network PC, a peer device or other common network node, and typically includes many or all of the elements described above relative to the computer 60. The logical connections depicted in FIG. 2 include a local area network (LAN) 121 and a wide area network (WAN) 123, but may also include other networks. Such networking environments are commonplace in offices, enterprise-wide computer networks, intranets and the Internet.

When used in a LAN networking environment, the computer 60 is connected to the LAN 121 through a network interface or adapter 120. When used in a WAN networking environment, the computer 60 typically includes a modem 122 or other means for establishing communications over the WAN 123, such as the Internet. The modem 122, which may be internal or external, may be connected to the system bus 71 via the user input interface 110, or other appropriate mechanism. In a networked environment, program modules depicted relative to the computer 60, or portions thereof, may be stored in the remote memory storage device. By way of example, and not limitation, FIG. 2 illustrates remote application programs 135 as residing on remote computer 130. It will be appreciated that the network connections shown are exemplary and other means of establishing a communications link between the computers may be used.

It should be understood that the text analyzer 20 can reside on the computer 60 or any computer communicating with the computer 60 such as remote computer 130. Likewise, the lexicon 22 can reside on computer 60 in any of the storage devices described above, or be accessible through a suitable communications link.

FIG. 3 is a pictorial representation of the lexicon 22. In the exemplary embodiment illustrated, the lexicon 22 includes a header section 160, a word list section 162, an index table section 164, an indices section 166, two or more lexicon data sections 168 (herein by example 16 sections 168A, 168B, 168C, 168D, 168E, 168F, 168G, 168H, 168I, 168J, 168K, 168L, 168M, 168N, 168O, 168P), and a string heap section 170.

The header section 160 generally stores information as to the structure of the lexicon 22. For instance, the header section 160 can include information as to the name and version of the lexicon. The header section 160 can also include information as to the memory offset and size of each of the sections 162, 164, 166, 168A-168P and 170. Section 162 contains the word list of the lexicon 22. Any suitable format can be used to embody the word list in section 162. One particularly useful format comprises storing a word list in a "Trie" structure, which is a well-known data structure technique. Advantages of this format include being able to determine easily how many words may start with a particular prefix, which can be useful, for example, in handwriting recognition and when it is necessary to ascertain the likelihood that the user has written a particular letter. This format also allows the path of traversal to be known both forward and backwards. As indicated above, other forms word listing in section 162 can be used. For instance, a simple table or list can be used. In yet another embodiment, a "difference" technique can be used to store the word list, wherein the difference in symbols or characters between successive words is stored.

Before describing section 164, it may be helpful to first describe section 166 and its relationship with the plurality of data sections 168. As discussed in the background section, current lexicons require that all the information related to a particular word entry be read even though it may be only a portion of the information that is desired for use by a particular application, task, or module. Sections 168A-168P allow the data for each word entry in the lexicon to be organized as desired such that related lexicon information can be generally grouped together to be selectively accessed based for example on the application, task, or module. For instance, at least one of the sections 168A-168P can be used to store information related to spell checking, while other data sections store information related to standard linguistic classifications. The indices section 166 generally provides pointers (e.g. grouped in sets) to the data stored in sections 168A-168P as a function of word entries from word list section 162. In other words, the word list section 162 (e.g. Trie) directly or indirectly determines the access point or points (offsets) into the indices section 166. Generally, the method for obtaining word information includes accessing the word list section as a function of a given word to ascertain a pointer identification for the indices section. Using the pointer identification, a pointer (or set of pointers) for the word is obtained in the indices section. The pointer (or set of pointers) is then used to ascertain which data section (or data sections) of the plurality of data sections has information about the given word and where the information is located in the data sections. Thus, for a particular word entry present in section 162, the corresponding lexicon data stored in sections 168A-168P for that word can be selectively accessed through the indices section 166, thereby not requiring all the word information for a given word to be processed or at least read.

In one particularly useful embodiment, the pointer or set of pointers in indices section 166 for sections 168A-168P for each word entry in section 162 is classified by its part of speech ("POS") such as whether the word entry can be a noun, verb, adjective, etc. In this manner, the data for a POS of a word entry is a series of pointers to the POS information in sections 168A-168P. So, for an word entry with two POSs, there are two distinct sets of pointers in section 166. One set would indicate the location of information about the first POS (e.g. the noun form of the entry), and the second set of pointers would indicate the location of information about the other POS (e.g. the verb form of the entry) The indices section 166 thus provides a level of lexicon data classification, i.e., based on the POS of the word entry. At this point, it should be understood that other forms of classification besides POS can be used depending upon the language to which the lexicon 22 is directed. For example, rather than using parts of speech, inflection or tonal classifications can be used for Japanese or Chinese languages. Although exemplified herein where the indices section 166 provides POS classification, this feature should not be considered limiting or required.

It should also be noted that use of the word "word" as used herein also includes symbols, ideograms, logograms, etc. as used in languages such as Chinese and Japanese. Thus, lexicons for these languages can be constructed using aspects of the present invention and are intended to be covered by the claims unless noted therein.

In the exemplary embodiment, each pointer includes information related to which section 168A-168P the pointer points to, information related to the type of POS, and an offset value where the relevant data is to be found in the identified section 168A-168P. Although the pointers associated with a given word entry in section 162 can be a fixed, in the exemplary embodiment the number of pointers for each word entry can vary from word entry to word entry. In this manner, the indices section 166 can be more compact and flexible with no inherent fixed limitations.

A schematic representation of an exemplary pointer in section 166 for a word entry is provided below:

$$X_1: X_2: X_3: X_4:$$

where $X_1$ is a flag indicating the end of the set of pointers for the word entry, $X_2$ is information identifying one of the sections 168, $X_3$ is information identifying the POS or other classification, and $X_4$ is a value indicating the offset for the lexicon data identified by $X_2$. Using this format, the pointers for all the information for a given word are stored sequentially where the first pointer is identified directly or indirectly as a function of the word list section and the flag $X_1$ for the last pointer is set to indicate the end of the list of pointers for the given word. In one embodiment, indices section 166 is a large DWORD array (4 byte quantities, 4 byte word alignment for rapid access). In this embodiment, one byte comprises a one bit flag for $X_1$ indicating an end of the set of pointers, four bits $X_2$ indicating the section 168A-168P and three bits $X_3$ indicating the POS type. Three bytes are then used for $X_4$ to provide a 24 bit offset value to indicate where the data is stored sections 168A-168P. It should be understood that this format is but one example wherein other formats can also be used. Likewise, this example should not be considered required or limiting. Generally, the format of the pointers of indices section 166 is chosen so as to indicate the location of data in the plurality of sections 168, and if desired, one or more classifications of the word information.

At this point, it should also be noted that any data which is small enough to fit into the offset portion of a pointer entry in section 166 can be directly encoded in the indices section 166 rather than in a separate section 168A-168P. Examples of this type of data include spelling information, or probability and frequency data for the word entry, any of which often can easily be stored in the bits allocated for the data offset values.

As indicated above, entry into the indices section 166 is a function of the word entry from section 162. Various techniques can be used to transition between sections 162 and 166. In a first embodiment, each word entry in section 162 could include the required offset into section 166. If however, section 162 comprises a Trie structure modification of the Trie leaf node structure may be necessary. Alternatively, the offsets of the nodes in the Trie structure can be used as offsets to the indices section 166. In the exemplary embodiment, this would mean allocating 40 bytes (10 POS pointers) for the set of POS indices for a word entry. In yet a further embodiment, the offset value can be attached to the end of a word entry in section 166.

In yet another embodiment, the index table 164 is included in the structure of lexicon 22. Index table 164 allows mapping of word entries to the indices of section 166, and its particularly useful when the pointers in section 166 can vary in number from word entry to word entry. However, it is possible to use a fixed size number of pointers in indices section 166 for each associated word entry. Using this structure of section 166, the index table section 164 would not be needed. In this alternative embodiment, in the event word entries with greater number of pointers than the fixed number of index pointers in section 16 is allowed, an overflow table could be used.

As this point it should be noted that the offsets from section 162 into indices section 166, and more particularly, the pointers in section 166 that point to the data in section 168A-168B can be organized so as to provide efficiency and speed when retrieving data from lexicon 22. For example, the offset pointers can be organized so as to locate lexicon information in sections 168A-168P adjacent other information of frequently used words, or if desired, organize associated or related information in sections 168A-168B closer to each other such that when stored on a computer storage device such as a hard disk, floppy or the like, information retrieval times are shortened.

Data in the sections 168A-168P can be present therein, or if desired, pointers can be provided to reference data contained within the same section 168A-168P, in other sections 168A-168P, back to the word entries of section 162, and in the illustrative embodiment, also to a string heap 170. String heap 170 is used to provide a single storage location for a selected string, the data of which would need to be stored as multiple occurrences in sections 168A-168P. The string heap 170 can be a single section, or can include subsections similar to sections 168A-168P. Other forms of information in sections 168 can include Boolean flags, values, word lists in decision trees, etc.

Organization of the word entry data using a plurality of sections 168A-168P allows the lexicon 22 to be easily adapted to fulfill a particular application needs without consuming large amounts of memory on the computer upon which it is implemented. For instance, the lexicon 22 can be read into fast-access memory such as RAM; however, if a particular type of data in the lexicon is not needed that section or sections from the plurality of sections 168A-168P can be omitted. Although the pointers in indices section 166 can be modified to reflect only those sections 168A-168P that are present, in a further embodiment, modification is unnecessary since if the sections 168A-168P are present information is obtained whereas if the section is not present no information is sought. The sections present in the lexicon can be recorded, for example, in header 160, so as not to cause errors.

One particular benefit of the lexicon structure herein described is that a user or author of the lexicon can put any type of information about a word for later retrieval if the input 12 (FIG. 1) includes that word. Furthermore, the user defined information does not need to be co-mingled with other information contained in the lexicon, but rather, can be stored in a dedicated section(s) in the plurality of sections 168A-168P.

The following are but a few examples of lexicon data organized in sections suitable for sections 168A-168P. It should be noted these are but mere examples wherein the data of lexicon 22 can be organized in any desired manner for convenience or understanding. The sections herein described have been found to be particularly useful, they should not be considered as being required or limiting.

Morphology Data Section—such information can include pronunciation as well as other forms of the word for various word tense.

Standard Author Data Section—such information can include data indicating whether or not the word entry is singular, plural, or whether the word is animate or inanimate. The information related to the word entries for this section is generally well known information about the word entry such that a lay person could author. In this manner, this information can then be readily changed or altered to fit a user's requirements.

Standard Linguistic Data Section—such information includes linguistic information of the word entries. Although such information is not well known to the common lay person, linguists can readily understand this information and modify it as necessary.

Parsing Data Section—such information includes data helpful for natural language parsing.

Domain/Subject Data Section—such information relates to the domain or subject codes. For example, the information can indicate that the corresponding words are related to physics, mathematics, geography, food, etc.

Spelling Data Section—such information is related to spell checking, for example, dialect markings, restricted markings, etc. Restricted markings indicate words that are allowed but are not suggested during spell checking such as vulgarities, acronyms, archaic terms, etc.

Multiple Word Expression Data Section—such information is useful when multiple words need to be separately identified such as idioms, proper names, titles of a books or movies, titles of offices, names of places, etc. Commonly, the data stored with respect to each word entry are the words that precede and/or follow the word in a multiple word expression.

For example, one of the sections of the plurality of sections 168A-168P can include arbitrary hierarchical name value pairs to find solely by the author of the lexicon entries. For instance, if an author wishes to add Name Entity (NE) information about a multiple word expression (discussed above), the author can add a set of name string based value pairs into the section, which in XML format can be represented as:

```
<named-entity>
    <app-ne-id>movieFinder::the_longest_day</app-ne-id>
    <semantic-type>movieFinder::movieTitle</semantic-Type>
        <genre>Drama</genre>
        <URL>http://www.movieFinder.com/fetch-movie-info/
            the_longest_day</URL>
        <movie-info>
            <date>Jan.30, 1969</date>
            <running-time>137 min.</running-time>
            <studio>20$^{th}$ Century Fox</studio>
        </movie-info>
        <non-rated/>
</named-entity>
```

The section can thus represent string based simple value name pairs of arbitrary nesting. The format does not support XML tag attributes, rather the author encodes these as separate sub-elements of that section. In the above example, the data for the movie title has a mix of application specific data that can be stored if desired.

The structure of lexicon 22 accommodates writeable lexicons by taking advantage of the fact that each section of the lexicon need not be continuous with the section immediately preceding it. In other words, sections can reserve extra unused space for future expansion. Update operations to the lexicon are performed by writing the new value(s) in the correct location(s). Note that if the lexicon 22 is embodied as a DLL (Dynamic Linked Library) based lexicon or precompiled (static) file base lexicons which have no reserve space, a simple free list implementation finds free entry space based upon a first-fit algorithm.

Generally, a method for storing word information in lexicon 22 includes storing word information in the plurality of data sections 168, each data section storing substantially different selected information about the words in a word list; storing pointer information in indices section 166, which is separate from the plurality of data sections 168, each of the pointers pointing to selected data in the plurality of data sections 168; and storing the word list in the word list section 162 separate from the plurality of data sections 168 and the indices section 166, the word list having information for identifying the corresponding pointers related to a selected word. If desired, identification values can be stored in the index table section 164, where each identification value corresponds to a word in the word list section 162 and is associated with a pointer in the indices section 166. Likewise, classification indications can be included in the pointers to classify the word information.

The structure of lexicon 22 is particularly useful when it is desirable to obtain information from a number of lexicons. In general, the data for multiple lexicons for a particular word entry can be combined, ignored or selected as desired. Examples of combining lexicon information from a number of lexicons exist in an implementation where a core or base lexicon contains the a first quantity of information about word entries, a second lexicon includes a second quantity of information about the word entries for a particular domain, and a third lexicon includes a third quantity of information about the word entries as determined by the user.

Figure 4:
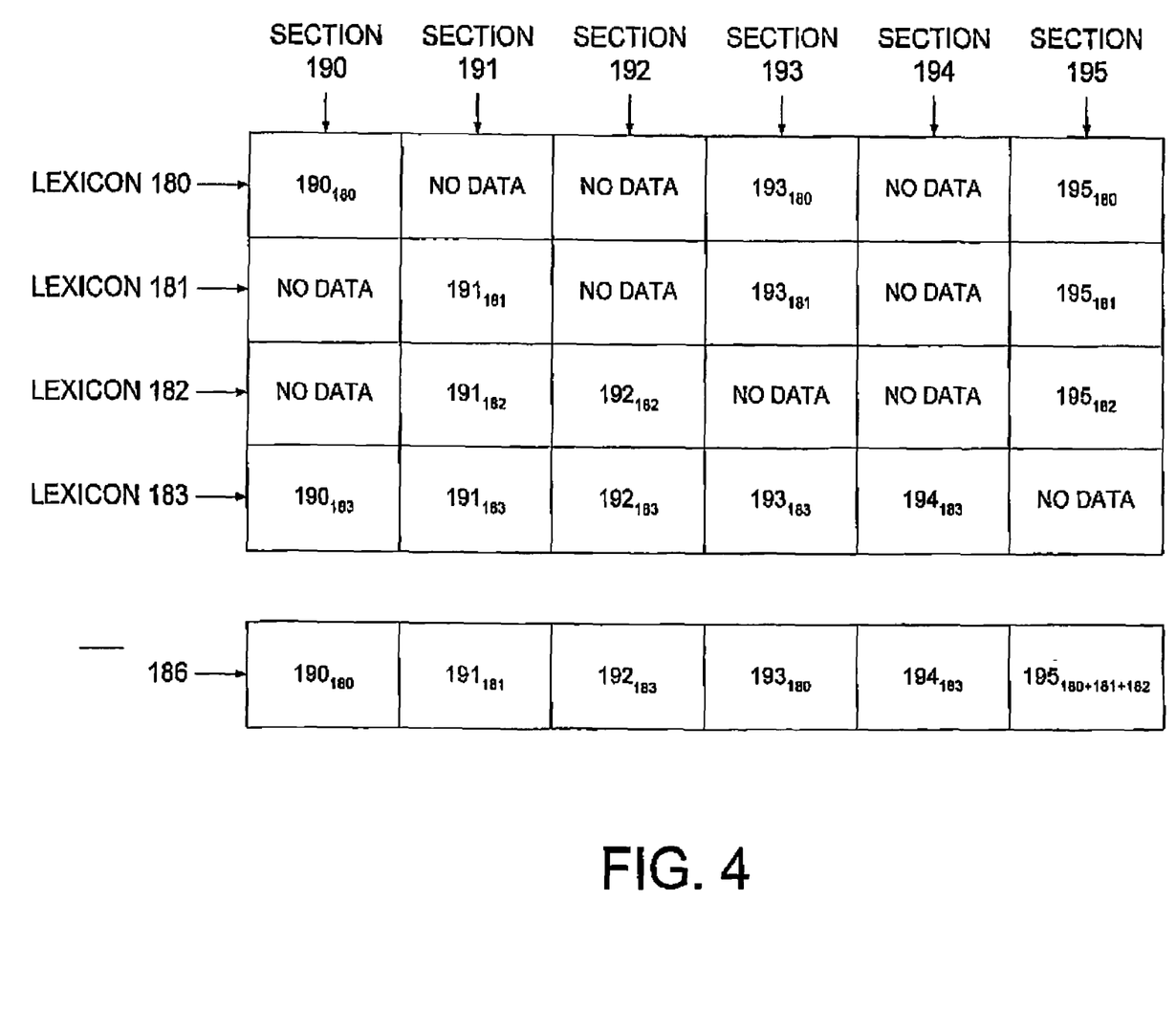
FIG. 4 is a pictorial representation of retrieving or accessing information across a plurality of lexicons.

FIG. 4 schematically illustrates how information for a particular word entry can be obtained from multiple lexicons. In FIG. 4, the lexicons (as represented by the data sections only, but otherwise having some or all of the sections illustrated in FIG. 3) are organized in rows and indicated at 180, 181, 182 and 183. Individual data sections (corresponding to sections 168) are represented vertically in FIG. 4, and in this illustrative embodiment, a maximum of six data sections 190, 191, 192, 193, 194 and 195 can be accessed across the four lexicons 180-183. Note that it is not necessary that each lexicon 180-183 include all of the data sections 190-195, and in many practical instances, such correspondence between all the data sections of all of the lexicons would not exist.

In FIG. 4, the notation $X_y$ is used to indicate data in a lexicon section, where X denotes one of the data sections 190-195 and Y denotes the lexicon 180-183. For example, lexicon 180 comprises data sections $190_{180}$, $193_{180}$ and $195_{180}$.

Since the data in the lexicons 180-183 has been organized in sections 190-195 having the same type of content, the information can be readily combined or selected across the lexicons 180-183. The information can be obtained for a given word entry by examining the information in the first lexicon 180 and then advancing to the same data section of the other lexicons 181-183 as needed. In one embodiment, the data to retrieve is controlled by a runtime-defined set of desired section types. One variable determines whether to read, or not to read, data for an entry of a lexicon. A second variable determines whether to combine or overwrite data from entries previously read from the corresponding section of the other examined lexicons. Schematically, it can be considered that the lexicons are "stacked" and that information is obtained by reading the data section 190-195 for the top-most lexicon in the stack and then preceding sequentially down through the stack, following the rules as to read or not, and whether to select, ignore, overwrite or combine. The lexicon structure illustrated in FIG. 3 allows the implementer to chose how data from a given section type combines or overrides the data for the same section in the other lexicons.

In FIG. 4, the information 186 obtained from the lexicons 180-183 comprises information corresponding to sections $190_{180}$, $191_{181}$, $192_{183}$, $193_{180}$, $194_{183}$ and $195_{180+181+182}$. In this example, data for sections 190, 191, 193 and 194 are obtained simply by examining the lexicons 180-183 in order on a section by section basis until a stop indicator has been found in one of the data sections. For example, although both lexicon 180 and 183 have information in section 190, only the information in lexicon 180 is retrieved because a stop indicator was found in section $190_{180}$. At run-time, this causes the information in section $190_{183}$ to be ignored. In contrast, the information in sections $195_{180}$, $195_{181}$ and $195_{182}$ is combined together to form the information $195_{180+181+182}$ because a stop indicator was not found until section $195_{182}$ was examined. If desired, information across the sections for all the lexicons can be combined, ignored or otherwise selected based upon rules implemented by the text analyzer 20 or by an interface module, not shown, that accesses the lexicon 22 based on requests from the text analyzer 20. For instance, such rules can indicate that a particular section of a particular lexicon is to always be used regardless of whether information is present in corresponding sections of other lexicons. This is represented in FIG. 4 where although information is present in lexicon 182, section 192 and at least examined first because it is higher on the stack, the information in section 192 of lexicon 183 is obtained. However, selection of data can also be on a word entry by word entry basis, for example, using the stop pointers as described above.

In summary, an improved lexicon structure has been described that provides flexibility and efficiencies not previously available. The indices section and the plurality of data sections allow the lexicon to be adapted to fit the needs of the text processing system and/or the available computer resources. The improved data structure also allows the data of multiple lexicons to be selectively accessed and/or combined as desired.

Although the present invention has been described with reference to preferred embodiments, workers skilled in the art will recognize that changes may be made in form and detail without departing from the spirit and scope of the invention.

What is claimed is:

1. A computer readable storage medium having a lexicon for storing word information and adapted for use with a text analyzer in a language processing system, wherein the lexicon is adapted to be used in a plurality of language processing tasks, the lexicon comprising:
    a word list section for storing a list of words;
    a set of data sections corresponding with each word on the word list, wherein the data sections store substantially different selected information about the corresponding word in the word list; and
    for each word on the word list, a plurality of pointers stored in an indices table apart from the sets of data sections, each of the pointers pointing to a different data section related to different information about the corresponding word, wherein the plurality of pointers comprises a first set and a second set of the pointers, the first set used to access information related to a first natural language processing task and the second set used to access information related to a second natural language processing task, wherein the first set of the pointers is not the same as the second set of the pointers.

2. The computer readable storage medium of claim 1 wherein the word list section comprises a Trie data structure.

3. The computer readable storage medium of claim 2 wherein each pointer includes an identification as a function of nodes in the Trie data structure.

4. The computer readable storage medium of claim 2 wherein each pointer includes an identification comprising an offset value stored with the Trie data structure.

5. The computer readable storage medium of claim 1 wherein each pointer includes an identification comprising an offset value stored with the word list section.

6. The computer readable storage medium of claim 1 and further comprising an index table section for storing identifications correlated with words of the word list section, each word in the word list section having a corresponding entry in the index table section.

7. The computer readable storage medium of claim 1 wherein each of the pointers includes a first indication of which data section to access and a second indication of an offset value related to the information stored therein.

8. The computer readable storage medium of claim 7 wherein each of the pointers includes a third indication of a classification of the word.

9. The computer readable storage medium of claim 8 wherein the classification comprises part of speech (POS).

10. The computer readable storage medium of claim 8 wherein the classification comprises one of tonal and inflection features.

11. The computer readable storage medium of claim 8 wherein the pointers of each classification of each of the words are sequentially provided as a set in the indices section, and wherein each of the pointers includes a fourth indication comprising a flag indicating the last pointer of the corresponding set.

12. The computer readable storage medium of claim 11 and further comprising a string heap section for storing a plurality of strings, wherein a plurality of data locations in the set of data sections corresponding to each word reference the same string in the string heap section.

13. The computer readable storage medium of claim 11 and further comprising a header section providing information as to the size and location of the word list section, the indices sections and each of the set of data sections corresponding to each word.

14. The computer readable storage medium of claim 1 wherein one of the set of data sections corresponding to each word stores information related to spell checking.

15. The computer readable storage medium of claim 1 wherein one of the set of data sections corresponding to each word stores information related to morphology.

16. The computer readable storage medium of claim 1 wherein one of the set of data sections corresponding to each word stores information related to linguistics.

17. The computer readable storage medium of claim 1 wherein one of the set of data sections corresponding to each word stores information indicating a word belongs to a multiple word expression.

18. The computer readable storage medium of claim 1 wherein two data sections of the set of data sections corresponding to each word separately store information selected from the group consisting of spell checking information, morphology information, linguistic information and multiple word expression information.

19. The computer-readable storage medium of claim 1, wherein the language processing tasks include at least one of grammar checking and spell checking.

20. The computer readable storage medium of claim 1, wherein one of the data sections is a standard author data section.

21. The computer readable storage medium of claim 1, wherein one of the data sections is a standard linguistic data section.

22. The computer readable storage medium of claim 1, wherein one of the data sections is a parsing data section.

23. The computer readable storage medium of claim 1, wherein one of the data sections is a domain/subject data section.

24. The computer readable storage medium of claim 1, wherein one of the data sections is a spelling data section.

25. The computer readable storage medium of claim 1, wherein one of the data sections is a multiple word expression data section.

26. A computer-implemented method for obtaining word information by accessing a lexicon that is adapted for use in a plurality of different natural language processing tasks, wherein the lexicon is adapted to be used with a text analyzer in a language processing system, and wherein the lexicon stores word information pertaining to a plurality of words, the lexicon comprising:
a word list section storing the plurality of words;
sets of data sections, wherein each set of data sections corresponds with an individual word in the word list section, each data section among a set of data sections storing different selected information about the corresponding word in the word list; and
an indices section storing a plurality of pointers apart from the sets of data sections, wherein each plurality of pointers corresponds with an individual word and comprises a first set of pointers associated with a natural language processing task and a second set of pointers associated with a different natural language processing task, wherein the first set of pointers is different from the second set of pointers, each of the sets of pointers pointing to data in a data section, the method comprising:
accessing the word list section as a function of said word to ascertain a pointer identification for the indices section;
using the pointer identification to obtain one of the first or second sets of pointers in the indices section based on the natural language processing task to be performed;
using one of the first or second sets of pointers to obtain information from only some data sections of the set of data sections, the only some data sections having information about said word necessary to perform the natural language processing task.

27. The computer-implemented method of claim 26 wherein the identification is an offset value stored with the word list section.

28. The computer-implemented method of claim 26 wherein the lexicon further comprises an index table section storing each of the identifications correlated with words of the word list section, and wherein accessing the word list section as a function of said word to ascertain a pointer set identification for the indices section further includes using the word list section to find a corresponding entry in the index table section having the corresponding identification.

29. The computer-implemented method of claim 28 wherein the pointers of the pointer set pertaining to each word are grouped together as a function of a classification, and wherein the method further comprises identifying the classification and using the pointers of the identified classification.

30. The computer-implemented method of claim 29 wherein the classification is a function of part of speech (POS).

31. The computer-implemented method of claim 26, and further comprising selectively accessing the data sections based on the identified pointers, wherein selectively accessing comprises only accessing data sections associated with an identified pointer.

32. The computer-implemented method of claim 31, wherein selectively accessing comprises not accessing some data sections.

33. A computer-implemented method for storing word information in a lexicon adapted for use in a plurality of natural language processing tasks, wherein the lexicon is adapted for use with a text analyzer in a language processing system, the method comprising:
storing word information in a sets of data sections, each set of data sections corresponding with an individual word in a word list, each data section of a set of data sections storing substantially different selected information about the corresponding word in the word list;
storing sets of pointers in an indices section separate from the sets of data sections, each set of pointers corresponding with an individual word in the word list, wherein some words comprise a first set of pointers associated with a natural language processing task and a second set of pointers associated with a different natural language processing task, wherein the first set of pointers is different from the second set of pointers, and wherein each of the pointers points to selected data in the sets of data sections; and
storing the word list in a word list section separate from the sets of data sections and the indices section, the word list having information for identifying the corresponding set of pointers corresponding to an individual word.

34. The computer-implemented method of claim 33 wherein the information for identifying is an offset value stored with the word list section.

35. The computer-implemented method of claim 33 and further comprising:
storing identification values in an index table section separate from the sets of data sections, each identification value corresponding to a word in the word list section and being associated with a pointer set in the indices section.

36. The computer-implemented method of claim 35 wherein the set of pointers corresponding to each word are grouped together as a function of a classification, and wherein storing sets of pointers includes assigning an indication of the classification in each of the pointers.

37. The computer-implemented method of claim 26 wherein the classification is a function of part of speech (POS).

38. A computer-implemented method for obtaining word information from a plurality of lexicons adapted for use in a plurality of different language processing tasks, the plurality of lexicons adapted for use with a text analyzer of a language processing system, each lexicon comprising:
a word list section storing a plurality of words;
sets of data sections, wherein each set of data sections corresponds with an individual word in the word list, each data section of a set of data sections storing different selected information about the corresponding word in the word list; and
an indices section storing a plurality of pointers for each individual word in the word list, the indices section stored apart from the sets of data sections, wherein each plurality of pointers comprises a first set of pointers associated with a natural language processing task and a second set of pointers associated with a different natural language processing task, wherein the first set of pointers is different from the second set of pointers, each of the pointers pointing to data in the sets of data sections, the method comprising:

selectively accessing the sets of data sections of each of the lexicons having similar information and obtaining information therefrom using the first set or second set of pointers based on the particular language processing task performed.

39. The computer-implemented method of claim 38 wherein selectively accessing includes combining the word information from at least two data sections of each of the lexicons having similar information.

40. The computer-implemented method of claim 38 wherein selectively accessing includes obtaining the word information from a data section of a first lexicon, obtaining the word information from a data section of a second lexicon and then using only the information from the data section of the second lexicon.

41. The computer-implemented method of claim 38 wherein selectively accessing includes obtaining the word information from similar data sections of each lexicon until a stop indicator is located.

42. The computer-implemented method of claim 38 selectively accessing the data sections includes sequentially accessing the plurality of lexicons in a selected order where a first instruction is followed pertaining to whether or not to read the word information from each lexicon, and where a second instruction is followed pertaining to combine the word information of more than one of the plurality of lexicons.

43. The computer-implemented method of claim 38 wherein selectively accessing the data sections comprises:

for each lexicon that is accessed,
  accessing the corresponding word list section as a function of a given word to ascertain a pointer identification for the corresponding indices section based on the particular natural language processing task;
  using the pointer identification to obtain a pointer of the corresponding indices section; and
  using the pointer to ascertain which corresponding data section of the plurality of data sections has information about said word and where the information is located in the corresponding data section.

44. The computer-implemented method of claim 43 selectively accessing the data sections includes sequentially accessing the lexicons in a selected order.

* * * * *

UNITED STATES PATENT AND TRADEMARK OFFICE
CERTIFICATE OF CORRECTION

| | |
|---|---|
| PATENT NO. | : 7,490,034 B2 |
| APPLICATION NO. | : 10/137456 |
| DATED | : February 10, 2009 |
| INVENTOR(S) | : James P. Finnigan et al. |

It is certified that error appears in the above-identified patent and that said Letters Patent is hereby corrected as shown below:

In column 14, line 48, in Claim 37, delete "claim 26" and insert -- claim 36 --, therefor.

Signed and Sealed this
Third Day of May, 2011

David J. Kappos
*Director of the United States Patent and Trademark Office*